United States Patent Office 3,819,785
Patented June 25, 1974

3,819,785
FINE-GRAIN ALUMINA BODIES

John F. Argyle, Bethlehem, and Glenn O. Medowski, David W. Ports, and Richard D. Sutch, Allentown, Pa.; said Medowski, Ports and Sutch assignors to Western Electric Company, Incorporated, New York, N.Y., said Argyle assignor to Bell Telephone Laboratories, Incorporated, Berkeley Heights, N.J.
Filed Feb. 2, 1972, Ser. No. 222,974
Int. Cl. B28b 1/26; C04b 35/64
U.S. Cl. 264—63          5 Claims

ABSTRACT OF THE DISCLOSURE

A casting slip for fine-grain alumina bodies includes alumina, a grain-growth inhibitor such as magnesia, a solvent including trichloroethylene and tetrachloroethylene, and a deflocculant such as menhaden oil. These ingredients are milled. Then, a binder such as polyvinyl butyral resin with a low viscosity and a low hydroxy content and plasticizers such as polyalkylene glycol and phthalate ester are added to these ingredients and the entire slip is mixed. Next, the slip is cast onto a moving carrier sheet into the form of a tape which is dried, punched and fired to form fine-grain alumina bodies which are particularly useful as subtrates for microcircuits, including thin film and integrated circuits. The slip is nonflammable and vapors therefrom produce a nonexplosive mixture with air. Also, solvents of the tape do not excessively attack the sheet onto which it is cast and the cast tape is accordingly very flat. The tape is also very flexible and easy to roll up and store. The flat tape, when punched and fired, produces flat alumina bodies.

BACKGROUND OF THE INVENTION

Field of the Invention

This invention relates to casting slips for fine-grain alumina bodies and methods of making the slips, and tapes and flat bodies made from the slips. More particularly, this invention relates to casting slips having nonflammable and reclaimable solvents, which, when cast into tapes, have increased flatness and flexibility.

This invention is suited for use in the manufacture of fine grain, high alumina ceramic bodies. These bodies are particularly suited for use as substrates for fine-line microcircuits, such as thin-film and hybrid integrated circuits. These circuits may include inactive components such as resistors, capacitors, crossover networks and conductors, and may also include active components such as silicon integrated circuits bonded into mechanical and electrical engagement with various patterns of inactive and other active components.

Description of the Prior Art

In manufacturing fine-grain, alumina ceramic bodies in accordance with prior art techniques, a process having four basic steps has been used: milling, casting, punching, and firing. (See application, Ser. No. 37,373, filed May 6, 1970, by H. W. Stetson and W.J. Gyurk, assignors to Western Electric Company, Incorporated, now U.S. Pat. 3,698,923 and D. J. Shanefield, R. E. Mistler, "The Manufacture of Fine-Grain Alumina Substrate for thin Films," *The Western Electric Engineer*, pp. 26–31, July, 1971.)

In the first step of milling, alumina powder is combined with magnesia powder, trichloroethylene, ethanol and a deflocculant. For about 24 hours this mixture is rotated in a ball mill. Then, plasticizers and a binder are added, and the milling is continued for about another 24-hour period.

The deflocculant plays a major role by dissipating the attractive forces that exist between the alumina particles which are highly active. This prevents the mixture in the mill from thickening which would ordinarily render the active alumina mixture unworkable.

After being milled together for about 48 hours, the ingredients become a dispersion which looks very much like white paint. At this stage the dispersion is called a "slip." The slip is removed from the ball mill and dissolved air is removed from it, so that bubbles will not form during later steps of the process.

Next, the slip is cast using the doctor blade technique. The casting is normally done on a carrier sheet of cellulose acetate as it moves over stationary support plates. The cast slip is then permitted to dry so that it can be cut into easily handled segments. In this form the cast slip has the appearance and flexibility of a white leather-like plastic and is commonly called a "tape."

The tape is then cut into desired shapes with a punch press. The pieces are punched oversize to allow for shrinkage during firing.

In the last step of the process, the punched tape is fired which results in smooth, fine-grain, alumina ceramic substrates.

This prior art process has several significantly advantageous results which include, among other things: (a) producing smooth, fine-grain ceramic substrates suitable for fine-line microcircuits, and (b) greatly improving bond strengths when leads are thermocompression bonded to tantalum nitride films formed on the substrates.

However, it is important that the solvent used in making the slip be nonflammable and not capable of producing an explosive mixture with air because of potential danger to personnel and facilities, especially during ball milling and tape casting and drying operations when solvent fumes are likely to evolve. During the casting operation, this potential danger is accentuated by arcing caused by static electrical charge buildup on the carrier sheet as it passes over the support plates of the casting machine. The use of external heating facilities to enhance drying of the cast slip also accentuates this potential danger.

Increased flatness and flexibility of the ultimately produced dried tape is also very desirable. The increased flatness and flexibility greatly facilitates handling of the tape, and, more particularly, coiling it into rolls for storage and subsequent punching.

Further it is important that the solvent of the slip not excessively attack the cellulose acetate carrier sheet onto which the slip is cast so that a smaller gauge, more economical sheet can be used, when the sheet is excessively attacked by solvents, short term waviness results in the dried tape with a consequent loss of flatness. This waviness is not eliminated during subsequent firing.

It is also desirable that the solvent be reclaimable and therefore, reuseable.

SUMMARY OF THE INVENTION

It is, therefore, an object of this invention to provide new and improved casting slips for fine-grain, alumina bodies and methods of making the same.

A further object of this invention is to provide a casting slip having nonflammable and reclaimable solvents which, when cast into tapes, have increased flatness and flexibility.

With these and other objects in view, the present invention contemplates a new casting slip for a fine-grain alumina body that includes alumina, a grain-growth inhibitor, a solvent including trichloroethylene and tetrachloroethylene, deflocculant, a binder and plasticizers. The binder preferably is polyvinylbutyral resin having a low viscosity and a low hydroxyl content.

The invention also contemplates a method of making the casting slip, including milling alumina, a grain-growth inhibitor, a solvent of trichloroethylene and tertachloroethylene, and a deflocculant. After the milling, a binder and plasticizers are intermixed into the ingredients to thereby complete the slip.

The invention further contemplates a tape made from the casting slip and flat ceramic bodies made from the tape which is punched and fired.

BRIEF DESCRIPTION OF THE DRAWINGS

Other objects of the advantages of the present invention may be more clearly understood by reference to the following detailed descriptions and accompanying drawings, wherein.

DETAILED DESCRIPTION

Figure 1:
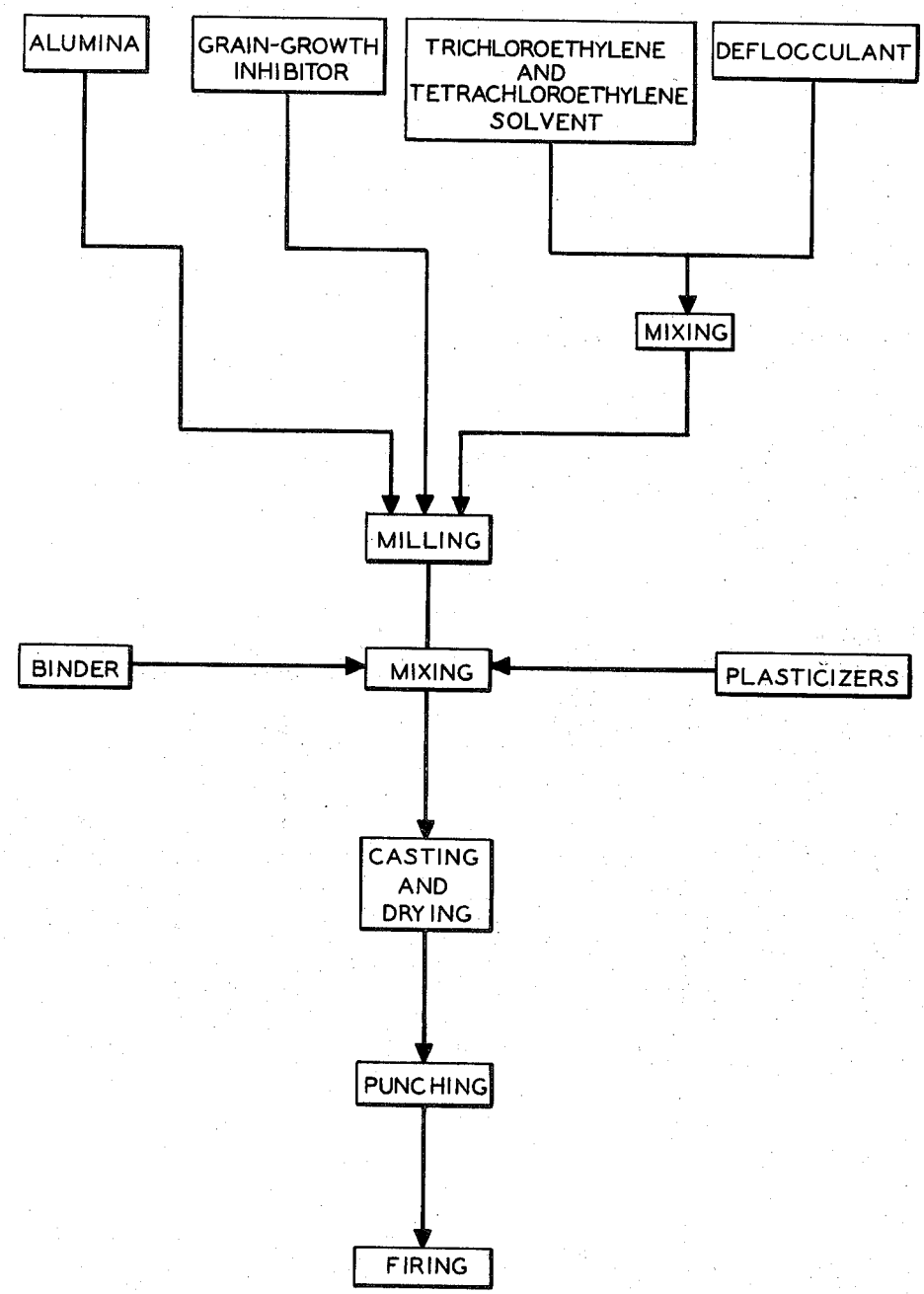
FIG. 1 is a flow chart showing the major ingredients and processing steps of the present invention.

Referring now to the drawing, and in particular to FIG. 1, a flow chart is shown for the manufacture of ceramic bodies, such as substrates suitable for microcircuits. The invention will be described as it is applied to the manufacture of thin, for example, 0.027 inch substrates.

ALUMINA

Alumina ($Al_2O_3$) shown in FIG. 1, is used as a raw material. Preferably, this alumina is highly reactive and may be that sold by Alcoa under the trade designation "A–16" or that sold by Reynolds under the trade designation "DBM–172." This alumina is calcined and dry ground to fine powder. It has a surface area in the range of 7 to 151 m.$^2$/gm. Of course, other dry ground alumina may be employed.

A batch of the alumina is placed in a mill. Advantageously, the mill is a Size 1 high alumina mill, such as that sold by the Norton Company under the trade designation and has a high alumina grinding media, such as Burundum 13/16 inch by 13/16 inch cylinders. It will be appreciated that larger and better equipment is available which will make milling faster and more efficient. It is to be noted, however, that since some pick-up of the grinding media is inevitable, the grinding media should not contain any deleterious elements. (Burundum is 85% $Al_2O_3$, 12% $SiO_2$, 2% MgO 1% CaO.)

GRAIN-GROWTH INHIBITOR

Preferably, a grain-growth inhibitor, shown in the flow chart of FIG. 1 is placed in the mill with the alumina. The presence of the grain-growth inhibitor allows a wider latitude in firing times. Grain-growth inhibitors are, essentially, merely impurities of a certain kind, and their use is well-known in the ceramic industries. Typical compounds are magnesia (MgO), nickel oxide (NiO) and talc, the latter being an acid metasilicate of magnesium of formula $H_2Mg_3SiO_{12}$. The selection of a particular grain-growth inhibitor is not critical to the process, but magnesia is preferred because it is readily available, pure, and comes as a very fine powder. Naturally, the amount of inhibitor added should be held to a minimum consistent with its desired effect. Addition thereof is preferred at a level of about 0.5 percent by weight of the alumina. The magnesia preferred herein is a reagent grade such as supplied by the Fisher Chemical Company.

SOLVENT AND DEFLOCCULANT

A solvent and a deflocculant, shown in the flow chart of FIG. 1, are placed in the mill with the alumina and magnesia. Preferably, the solvent and the deflocculant are premixed prior to being placed in the mill to better ensure complete intermixing.

The proportions of alumina to solvent is not critical, so long as the mixture has a watery or milk-like consistency. With Alcoa A–16 or Reynolds DBM–172 alumina as the raw material, an alumina-to-solvent ratio of about 1.7 gives a good consistency.

The first requirement for the solvent is that it be volatile at low temperatures so that it will be driven off as the tape dries. Organic solvents are thus a good choice. The solvent must also be effective in dissolving the binders and preferably have a low viscosity.

In accordance with the present invention, the solvent meeting these requirements is a mixture of trichloroethylene and tetrachloroethylene. Most significantly, this solvent is nonflammable and does not result in an explosive mixture with air. It is also reclaimable by the use of conventional apparatus that collects the vapors of this solvent during the subsequent drying of a tape cast from a slip which is formulated in accordance with this invention.

Figure 2:
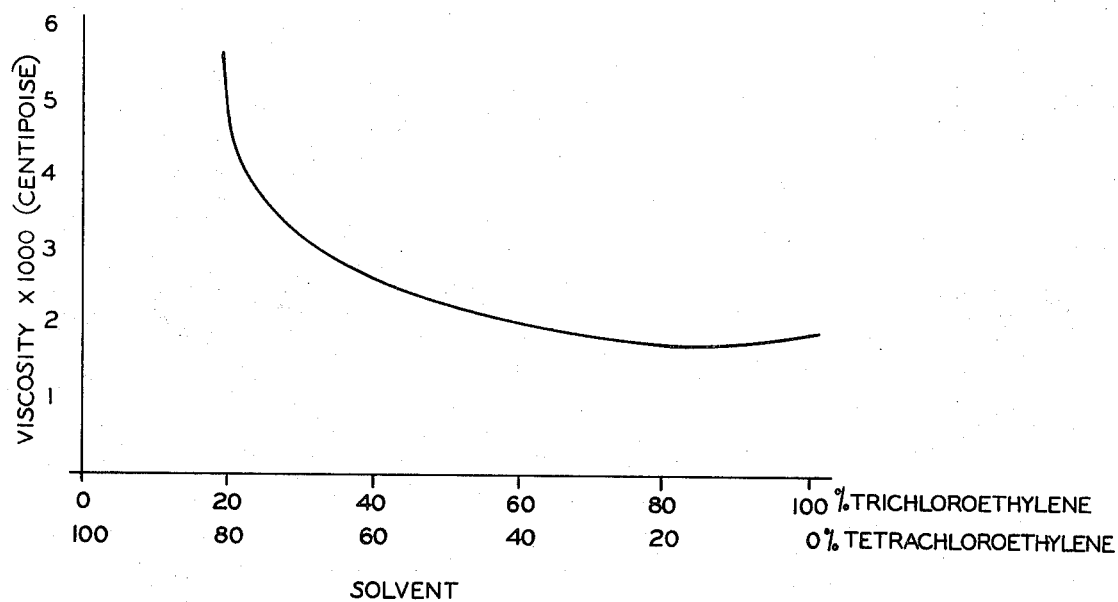
FIG. 2 is a graph showing how slip viscosity varies with respect to solvent concentration of trichloroethylene and tetrachloroethylene.

Referring now to FIG. 2 of the drawing, a graph shows how viscosity of the slip subsequently formulated in accordance with this invention varies in accordance with the percentage by weight of trichloroethylene and tetrachloroethylene. From this graph it is clear that a mixture of 80 percent by weight of trichloroethylene and 20 percent by weight of tetrachloroethylene gives the lowest slip viscosity. This mixture also stays well dispersed during subsequent casting while a mixture containing higher percentages of tetrachloroethylene becomes more viscous and had a tendency to curdle.

Mixtures with concentrations of less than 90 percent by weight of trichloroethylene were favored due to higher average density of subsequently fired tapes and significantly less attack on the cellulose acetate carrier sheet. Typically, an effective concentration of solvent is 60 percent by weight of trichloroethylene and 40 percent by weight of tetrachloroethylene.

It has been found with this ratio of trichloroethylene and tetrachloroethylene the subsequently cast tape has increased flexibility and flatness.

Concerning the deflocculant, it is essential that it be used during the subsequent milling to keep the alumina evenly dispersed in the solvent, that is to prevent agglomeration. Small alumina agglomerates or precipitates are likely to form and ruin the batch without sufficient deflocculant addition. Fatty acids and synthetic surfactants such as the benzene sulfonic acids are suitable deflocculants. However, the criteria for deflocculant selection for the present invention is that one which will do a good job in the least volume of addition. Natural fish oils perform very well and, in particular, a menhaden oil marketed under the trade name "Ensign Z–3" by Haynie Products Incorporated is preferred. A total addition of this oil amounting to about 1.5 to 2.0 percent by weight of the alumina was found sufficient.

MILLING

With the alumina, the grain-growth inhibitor, the solvent, and the deflocculant in the mill, milling is commenced, as shown in the flow chart of FIG. 1. The time spent in milling the batch depends on three factors: (a) the as-received size of the alumina, (b) the milling equipment employed, and (c) the quality of finish desired on both surfaces. Advantageously, the milling is continued for approximately 24 hours.

MIXING

At the completion of milling, it is advantageous to leave the ingredients in the mill and add the other slip ingredients thereto, since the mill can also be used to mix the additional ingredients. Of course the milled mixture, which has the consistency and appearance of thin milk, may be removed to a separate mixer for this purpose, if desired.

Binder and Plasticizers

The other slip ingredients, which include a binder and plasticizers (shown in the flow chart of FIG. 1), are at this time added to the mill. The order of addition is not important.

The function of a binder is to retain the alumina particles in undisrupted position after the organic solvent evaporates during a subsequent drying operation. That is, the binder holds the subsequently cast tape together until it is fired into a hard ceramic. In carrying out this function, the binder must not cause any cracks, pinholes or other imperfections in the tape or the subsequently fired ceramic and, of course, it must volatilize at the firing temperature. Selection of a binder is in part dependent on the surface onto which the slip is later cast, in that the binder will bond more or less to the surface during drying. As noted hereinbelow, the preferred casting surface is cellulose acetate although other casting surfaces, such as a chromium-plated stainless steel belt or those sold under the trademarks "Mylar" and "Aclar," may also be used.

For casting on these surfaces polyvinyl butyral resins are preferred as binders. Use of these binders when casting on glass is not impossible, but great care must be exercised when removing the tape therefrom to prevent tearing as the bond formed is considerably stronger.

Several grades of polyvinyl butyral resin are marketed under the tradename "Butvar" by the Monsanto Company. While these are all commonly used in ceramic preparation, the desirable features required for use in the present invention are low viscosity and low hydroxyl content (in the order of about 11 percent by weight of polyvinyl alcohol of the polyvinyl butyral). Another desirable feature is effectiveness at low concentrations.

Accordingly, the polyvinyl butyral resin sold by Monsanto Company under the trademark "Butvar" and the trade designation "B–79" is preferred. This has a lower viscosity when dissolved in a solvent than many other grades (about 55 centipoises (cps.) as a 10 percent by weight solution in ethanol) due to a lower molecular weight under about 38,000 to about 34,000, and is effective at an addition level of 2.5 percent by weight of the alumina in the slip. It also has a lower hydroxyl content then many other grades (in the order of about 9.0 to 13.0 percent by weight of polyvinyl alcohol of polyvinyl butyral). Other binders common in the industry are poly- methyl methacrylate resin, cellulose acetate butyral resin, etc., but these are not found to be as satisfactory as the polyvinyl butyral resins.

Ordinarily in the preparation of most ceramics, the binder must be "compatibly plasticized" with a suitable plasticizer unless the binder itself is of a very low viscosity. The function of the plasticizer is to improve the flexibility and workability of the dried (that is, solvent-free) tape. As plasticizers for polyvinyl butyral resin binders, polyalkylene glycol derivatives such as triethylene glycol hexoate have been proposed heretofore as being fully compatible. However, when used to prepare the slips of the present invention, this plasticizer resulted in a slip which was too stiff to cast properly. On the other hand, other supposedly compatible plasticizers, such as methyl abietate, dimethyl phthalate or tricresyl phosphate, all resulted in substrates having crazed or "mud flat" surfaces. While the reason for this is not known, it is speculated that these plasticizers become somehow oriented within the slip and create tensional forces between the surface and bulk volume areas of the cast tape, when driven off during drying. The polarity of the plasticizer molecule may be a factor.

As indicated in the aforementioned application, Ser. No. 37,373, it was found that the stiffness of the glycol plasticizer could be overcome and the crazing of the other plasticizers eliminated if the glycol was mixed with a second plasticizer, preferably of the phthalate type. In particular, it was found that excellent results were obtained by mixing about 4 parts of glycol with about 6 parts of a mixed phthalate ester of normal hexyl, octyl and decyl alcohols such as is marketed by Allied Chemical Company as P–61.

The addition of a plasticizer is ordinarily expressed as parts per hundred of resin ("p.p.h.r.") and, to get a suitable result, plasticizer addition to the slip of the invention should be about 250–300 p.p.h.r. The glycol plasticizer which is preferred is marketed by Union Carbide Corporation as UCON 2000 (the 2000 representing its viscosity measured in centipoises). The total plasticizer addition amounts to about 7 percent by weight of the slip.

After the binder and plasticizer have been added to the mill, it is closed and the mixing step shown in the flow chart of FIG. 1 is commenced by running the mill. It is run for a sufficient period to insure a complete and intimate mixture of all ingredients and the formation of a completely uniform slip. Approximately 24 hours is sufficient for the mill used herein.

The finished slip has the appearance and viscosity of heavy cream, and is completely smooth. While slips having this general viscosity proved satisfactory and no close control was kept on viscosity (other than measurement by eye), it will be understood that large scale usage of the invention will involve careful viscosity control, since shrinkage during firing is directly related thereto.

After the milling step, a vacuum is drawn on the slip to remove any dissolved air. This is necessary so that bubbles will not form during the latter steps of the process. Next, the slip is filtered to remove any large pieces of unground alumina or undissolved binder which are present.

CASTING AND DRYING

Figure 3:
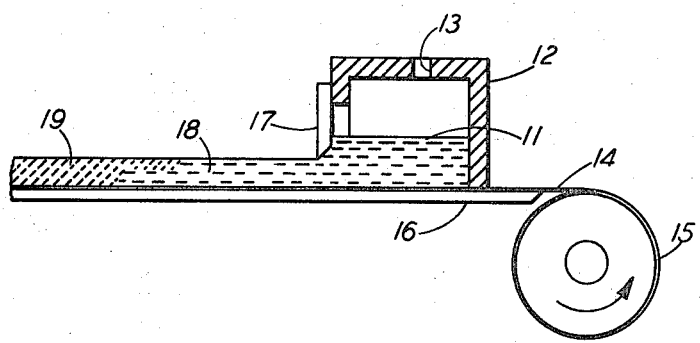
FIG. 3 is a schematic diagram of a doctor blade casting machine for casting the slip of the present invention.

Referring now to FIG. 3, a schematic diagram of a conventional doctor blade casting machine is shown. The de-aired and filtered slip, now designated by reference numeral 11, is pumped into a chamber 12 through an orifice 13 at a rate about equal to the casing rate, care being taken not to introduce air bubbles during pumping. Thus, an approximately constant level of the slip 11 is maintained in the chamber 12, resulting in a constant hydrostatic pressure. A carrier sheet 14, for example, cellulose acetate, is pulled from a supply roll 15 over a supporting plate 16 and across the open bottom of the chamber 12 and under a doctor blade 17. The blade 17 is set at the desired height to obtain the ultimately desired substrate thickness. The pulling of the carrier sheet results in the casting of a tape 18 on the sheet 14, the tape 18 being shown partially dried at 19.

Since the slip will start to solidify immediately on contact with the atmosphere, it is advisable to cover the top of the chamber 12 and the tape 18 coming out from under the doctor blade 17 to prevent lump or skin formation.

As the carrier sheet 14 is pulled over the supporting plate 16, a static electrical charge builds up on the sheet 14. However, because the solvent of trichloroethylene and tetrachloroethylene is nonflammable and does not produce an explosive mixture with air, there is practically no danger of a fire or explosion.

The solvent vaporizes at ordinary room temperatures. This evaporation may be accelerated by the application of external heat to the cast tape 18. The solvent may be reclaimed with conventional condensing or adsorbing apparatus.

Figure 4:
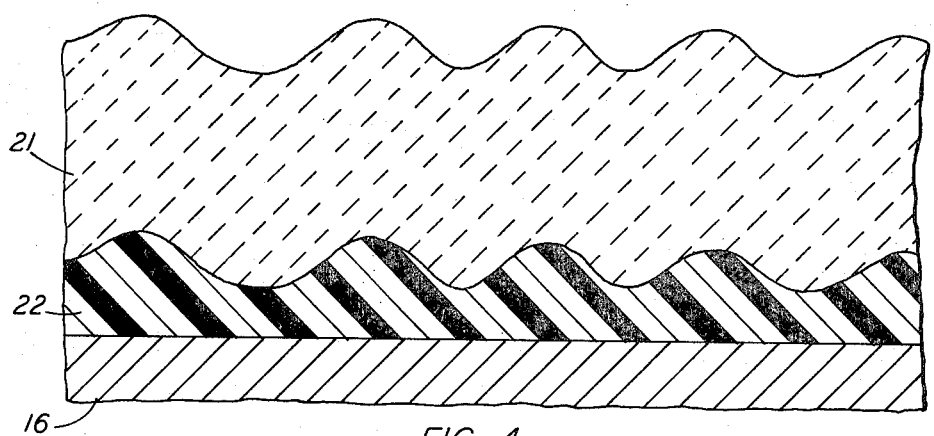
FIG. 4 is a greatly enlarged cross-sectional view, taken longitudinally along a prior art carrier sheet, showing the carrier sheet and a dried cast tape made with a prior art slip, and showing excessive attack by the solvents of the tape on the sheet with a consequent loss of flatness of the sheet and the tape.

A few hours of air drying produces a leather-hard tape. Because the solvent of trichloroethylene and tetrachloroethylene does not excessively attack the carrier sheet, short-term waviness of the carrier sheet and, hence, the dried tape is reduced. This reduction of waviness is approximately in the range of about three to about ten times and is exemplified by FIGS. 4 and 5. In FIG. 4 a greatly enlarged portion of a prior art dried tape 21 using as a solvent a mixture of trichloroethylene and ethanol is shown schematically. From this figure it is apparent that a carrier sheet 22 of the prior art is very wavy due to the solvent attack thereon and this waviness is transferred to the prior art tape 21 which is cast thereon. This waviness is not completely eliminated during subsequent firing of the tape 21.

Figure 5:
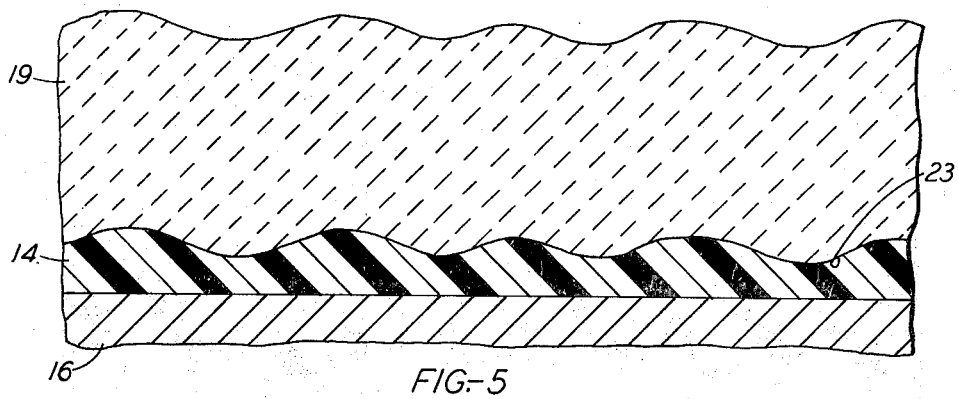
FIG. 5 is a greatly enlarged cross-sectional view, taken longitudinally along the carrier sheet of FIG. 3, showing the carrier sheet and a dried cast tape made with the slip of the invention, showing reduced attack by the solvents of the tape on the sheet with a consequent increase in flatness of the sheet and the tape.

On the other hand, FIG. 5 shows a greatly enlarged portion of the dried tape 19 and the carrier sheet 14 of the present invention. From this figure it is apparent that the waviness of the carrier sheet 14 and the tape 19 is significantly reduced. This reduction, as previously mentioned, is in the range of about three to ten times (in amplitudes of the waves of the sheet 14 and tape 19), and is due to a reduced solvent attack on the sheet 14. With this reduction in waviness, the tape 19 of the present invention is significantly flatter than the tape 21 of the prior art. Further, because of this reduction in solvent attack, the carrier sheet 14 can be reduced in thickness by about ⅓ over the carrier sheet 22 of the prior art, resulting in a significant material and cost savings. Whereas the prior art carrier sheet 21 was about 15 mils, the carrier sheet 14 of the present invention is typically about 10 mils.

Figure 7:
FIG. 7 is a cross-sectional view, taken laterally across the carrier sheet of FIG. 3, showing the carrier sheet and the dried cast tape made with the slip of the invention, and showing reduced attack by solvents of the tape on the sheet with a consequent increase in flatness of the sheet and the tape.
Figure 6:
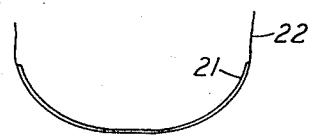
FIG. 6 is a cross-sectional view, taken laterally across the prior art carrier sheet of FIG. 4, showing the carrier sheet and the dried cast tape made with the prior art slip, and showing excessive attack by the solvents of the tape on the sheet with a consequent excessive curling of the sheet and the tape.

Referring now to FIG. 6, a sectional view, taken laterally across the prior art carrier sheet 22 of FIG. 4, is shown. It is apparent that the carrier sheet 22, having thereon the dried cast tape 21 made with the prior art slip, has significantly curled and lost its long term flatness as a result of excessive attack by the solvents of the tape. On the other hand, FIG. 7 shows a sectional view, taken laterally across the carrier sheet 14 of FIG. 5. From this figure it is apparent that there is a significant reduction in curling and increased long term flatness of the sheet 14 and the tape 19. This is the result of reduced attack by the solvents of the tape on the sheet. Hence, it is much easier to coil up the tape 19 and carrier sheet 14 of the present invention for storage and subsequent punching.

Not only is the tape 19 of the present invention flatter than the tape 21 of the prior art using a trichloroethylene and ethanol solvent, but it is also more flexible and pliant and is easier to bend without cracking. This flexibility along with its flatness facilitates handling of the tape 19 and enables the tape 19 to be coiled into rolls for storage and subsequent punching. The tape 19 is later punched using conventional techniques to the desired substrate size either before or after removal from the carrier sheet 14.

FIRING

Figure 8:
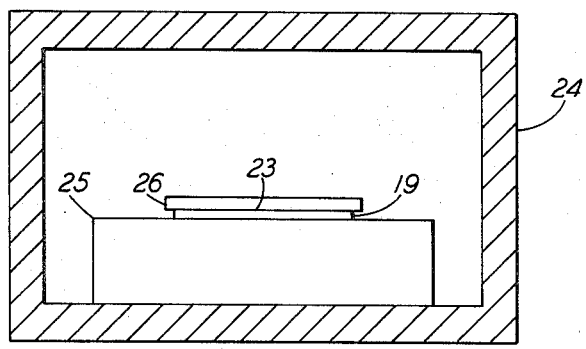
FIG. 8 is a schematic view of an oven for firing the dried and punched tape with a coverplate thereover.

Referring now to FIG. 8, a schematic diagram of a conventional, air-filled, firing oven 24 is shown. The oven 24 may be a Linderg tunnel kiln. The dried and punched tape, again designated by reference numeral 19, is removed from the carrier sheet 14. The tape 19 is then placed on a ceramic pusher slab 25 with the side 23 (FIG. 5) facing up. This side 23 is to be used for the most critical metallization steps in the forming of microcircuits, such as thin-film capacitors. Next, a flat cover plate 26 is placed on the side 23 of the tape 19. Advantageously, the coverplate 26 is formed from an alumina that is coarser than that of the tape 19 to prevent the coverplate 26 from sticking to the tape 19. Such an alumina, which is previously fired, is sold by Alcoa under the trade designation "A–14."

The coverplate 26 reduces curling or warping and prevents this during firing. A coverplate which is too heavy will not allow the substrate being fired to shrink, and this will cause cracking. On the other hand, a coverplate which is too light will not prevent warping during firing. The use of alumina A–14 for the coverplate 26, fabricated with a suitable weight, avoids both of these problems.

The slab 25 is then pushed into the air-filled oven 24 and firing, shown in the flow chart of FIG. 1, is commenced. The firing is carried out at temperatures in the range of 1425° to 1550° C., and for a period of about 15 minutes to about 3 hours.

The product produced by this process is substantially similar to that described in the aforementioned application, Ser. No. 37,373, but has improved short term flatness.

It is to be understood that te above-described arrangements, including steps, materials, and procedures, are simply illustrative of the application of the principles of this invention. Numerous other arrangements may be readily devised by those skilled in the art which will embody the principles of the invention and fall within its spirit and scope.

EXAMPLE

Understanding of the invention will be further facilitated by referring to the following specific example.

The following ingredients were placed in a jar mill such as a Norton BF–1 Burundum fortified jar mill:

Alcoa A–16 Alumina: 1900 grams
Magnesia: 3.5 grams

The following ingredients were premixed in a separate container:

Ensign Z–3 Menhaden Oil: 35 grams
Trichloroethylene: 1170 grams
Tetrachloroethylene: 910 grams These ingredients were then added to the above jar mill. Grinding media was 6,000 grams of 1³⁄₁₆ inch by 1⁵⁄₁₆ inch high alumina grinding cylinders such as Burundum. The jar mill was placed on the jar roller and rotated for 24 hours at 58 r.p.m.

After 24 hours of milling the following additional ingredients were added:

Butvar B–79 Polyvinyl Butyral Resin: 120 grams
Elastex P–61 Phthalate Ester: 108 grams
UCON 2000 Polyalkylene Glycol: 128 grams Milling was continued for an additional 24 hours at 58 r.p.m. to insure thorough dispersion of all ingredients in the slip. The finished slip was transferred from the mill to a glass desiccator and evacuated to 4 inches of Hg for 5 minutes.

The composition of the finished slip was as follows:

| Ingredient: | Percentage by weight |
|---|---|
| Alumina | 43.43 |
| Trichloroethylene | 26.75 |
| Tetrachloroethylene | 20.80 |
| UCON 2000 | 2.93 |
| Butvar B-79 | 2.74 |
| Elastex P-61 | 2.47 |
| Ensign Z-3 | 0.80 |
| Magnesia | 0.08 |
| | 100.00 |

The slip was cast on 10 mil cellulose acetate film supported on aluminum plates using a doctor blade set to 60 mils to produce a dried tape of 0.034 inches thick. During the drying operation most of the trichloroethylene and tetrachloroethylene evaporated leaving only residual amounts.

The dried tape was stripped from the cellulose acetate film and its flatness was determined to be about 0.060 inch per inch. This was compared to the prior art tape produced with an ethanol and trichloroethylene solvent under similar environmental conditions. The prior art tape had a flatness of about 0.180 inch per inch. The tape was then punched into segments of a size to yield 3.750 inches by 4.500 inches substrates upon subsequent firing and shrinkage.

The composition of the dried "leather-hard" tape was as follows:

| Ingredient: | Percentage by weight |
|---|---|
| Alumina | 82.4 |
| Binder | 5.2 |
| Polyalkylene Glycol Plasticizer | 5.6 |
| Phthalate Ester Plasticizer | 4.7 |
| Deflocculant | 1.5 |
| Magnesia | 0.2 |
| | 99.6 |

The tape segments were laid on a flat fired ceramic pusher slab. Each segment was covered with a coverplate made from Alcoa A-14 alumina of slightly greater dimensions than the segment and fired at 1500° C. for 3 hours.

The resulting substrates were flat, had a surface finish of 2-3 microinches, showed zero water absorption, had an average grain size of about 1.5 to 2.5 microns, and had a density of 3.9 grams per cubic centimeter. The dimensions of the fired substrate were 3.75 inches by 4.50 inches by 0.027 inches.

What is claimed is:

1. In a method of producing ceramic bodies of improved flatness wherein alumina and magnesia are milled together with a deflocculant and solvent, mixed with a plasticized binder and these materials are then cast onto a cellulose acetate sheet, the improvement which comprises:
using a solvent comprising trichloroethylene and at least 10% by weight of tetrachloroethylene so that the cellulose acetate sheet is not substantially attacked by the cast materials and the flatness of the tape is enhanced.

2. A method of making a tape for fine-grain alumina bodies, comprising the steps of:
milling together ingredients including alumina, magnesia, menhaden oil and a solvent of a mixture of trichloroethylene and at least 10% by weight of tetrachloroethylene;
mixing a polyvinyl butyral resin binder and polyalkylene glycol and phthalate ester plasticizers with the milled ingredients to produce a nonflammable casting slip;
casting the slip onto a cellulose acetate carrier sheet to produce a nonflammable tape which does not substantially attack the carrier sheet to thereby increase the flatness of the tape; and
drying the tape on the carrier sheet by evaporating the solvent while the sheet continues not to be substantially attacked by such tape, whereby a flat tape is made.

3. The method of claim 2, wherein the carrier sheet has a thickness of approximately 10 mils.

4. The method of claim 2 wherein the slip comprises, in percentages by weight, an intimate blend of:
about 43% of dry-ground, particulate alumina having a surface area of at least 7 square meters per gram;
up to about 0.5% magnesia;
about 25 to 30% trichloroethylene;
18 to 22% tetrachloroethylene;
up to about 1% of a menhaden oil;
2 to 3% of polyvinyl butyral binder resin;
2 to 4% of polyalkylene glycol plasticizer; and
2 to 3% phthalate ester plasticizer.

5. A method of making fine-grain ceramic substrates comprising the steps of:
milling together ingredients including alumina, a grain-growth inhibitor, a deflocculant and a solvent of a mixture of trichloroethylene and at least 10% by weight of tetrachloroethylene;
mixing a binder and plasticizers with the milled ingredients to thereby produce a casting slip;
casting the slip onto a cellulose acetate carrier sheet to produce the tape, whereby the attack of the slip and tape on the sheet is reduced by the presence of the solvent to enhance the flatness of the tape;
drying the tape;
punching the tape to form substrates; and
firing the tape at a temperature in range of about 1425° C. to about 1550° C. to thereby produce flat ceramic substrates.

References Cited
UNITED STATES PATENTS

| | | | |
|---|---|---|---|
| 3,695,960 | 10/1972 | Richter | 264—63 |
| 2,966,719 | 1/1961 | Park, Jr. | 264—63 |
| 3,518,756 | 7/1970 | Bennett et al. | 264—63 |
| 3,698,923 | 10/1972 | Stetson et al. | 264—63 |

OTHER REFERENCES

J. J. Thompson, "Forming Thin Ceramics," Ceramic Bulletin, Sept. 1963, at 480 and 481.

D. J. Shanefield et al., "The Manufacture of Fine-Grained Alumina Substrates For Thin Films," The Engineer (Western Electric) April 1971, at 26-31.

C. Marsden et al., Solvents Guide, Cleaver-Hume Press Ltd., London, 1963, at 65-69, 247-248, 510-513, 523-527 and 535-538.

DONALD J. ARNOLD, Primary Examiner

U.S. Cl. X.R.
264—66, 86

(6-69)

UNITED STATES PATENT OFFICE
CERTIFICATE OF CORRECTION

Patent No. __3,819,785__   Dated __June 25, 1974__

Inventor(s) __J. F. Argyle-G. O. Medowski-D. W. Ports-R. D. Sutch__

It is certified that error appears in the above-identified patent and that said Letters Patent are hereby corrected as shown below:

Col. 1, line 19 (Abstract, p. i, line 7) "hydroxy" should be --hydroxyl--;

line 25 (Abstract, p. i, line 12) "subtrates" should be --substrates--.

Col. 2, line 50 (Spec. p. 4, line 1) cancel "," and insert --. Also,--.

Col. 3, line 65 (Spec. p. 6, line 20) "151" should be --15--;

lines 69 and 70 (Spec. p. 6, line 24) after "designation" insert --"Burundum"--.

Col. 6, line 68 (Spec. p. 14, line 1) "casing" should be --casting--.

Signed and sealed this 24th day of September 1974.

(SEAL)
Attest:

McCOY M. GIBSON JR.          C. MARSHALL DANN
Attesting Officer            Commissioner of Patents